(12) United States Patent
Glas et al.

(10) Patent No.: US 7,020,221 B2
(45) Date of Patent: Mar. 28, 2006

(54) SYSTEM AND METHOD FOR AN IF-SAMPLING TRANSCEIVER

(75) Inventors: Jack P. Glas, Basking Ridge, NJ (US); Vladimir I. Prodanov, New Providence, NJ (US)

(73) Assignee: Agere Systems, Inc., Allentown, PA (US)

( * ) Notice: Subject to any disclaimer, the term of this patent is extended or adjusted under 35 U.S.C. 154(b) by 764 days.

(21) Appl. No.: 09/989,605

(22) Filed: Nov. 20, 2001

(65) Prior Publication Data

US 2003/0095612 A1 May 22, 2003

(51) Int. Cl.
*H03H 17/30* (2006.01)

(52) U.S. Cl. ....................... 375/329; 375/316

(58) Field of Classification Search ............... 375/329, 375/316, 130, 377, 350; 455/343.1, 343.6, 455/130, 266
See application file for complete search history.

(56) References Cited

U.S. PATENT DOCUMENTS

| | | | | |
|---|---|---|---|---|
| 4,755,761 | A * | 7/1988 | Ray, Jr. ...................... | 329/323 |
| 5,937,013 | A * | 8/1999 | Lam et al. .................. | 375/340 |
| 6,683,919 | B1 * | 1/2004 | Olgaard et al. ............. | 375/316 |
| 2002/0027965 | A1 * | 3/2002 | Kurihara ..................... | 375/343 |
| 2002/0034215 | A1 * | 3/2002 | Inoue et al. ................ | 375/147 |
| 2003/0053571 | A1 * | 3/2003 | Belotserkovsky et al. .. | 375/350 |

OTHER PUBLICATIONS

"Part 11: Wireless LAN Medium Access Control (MAC) and Physical Layer (PHY) specifications High-speed Physical Layer in the 5 GHz Band", Sponsor: LAN/MAN Standards Committee of the IEEE Computer Society, IEEE Std 802.11a-1999.

"Broadband Radio Access Networks (BRAN); HIPERLAN Type 2; Physical (PHY) layer", ETSI, ETSI TS 101 475 V1.2.2. (Feb. 2001).

"The Synthesis and Application of Polyphase Filters With Sequence Asymetric Properties", Michael John Gingell, 1975.

"Integrated Wireless Transceiver Design with Emphasis on IF Sampling", Mihai Banu, Bell Laboratories, Lucent Technologies; Carlo Samori, Politecnico di Milano, Italy; Jack Glas, Gell Laboratories, Lucent Technologies; John Khoury, Columbia University, New York.

Manetakis, Kostas et al.; "SC Quadrature Mixer for if Bandpass Sampling"; The 8$^{th}$ IEEE International Conference on PAFOS, CYPRUS; Sep. 5-8, 1999; pp. 9-12; Piscataway, NJ, USA.

(Continued)

*Primary Examiner*—Khai Tran

(57) ABSTRACT

The present invention is directed toward a radio, and method for receiving radio frequency signals. The radio comprises an input signal at a first intermediate frequency, an intermediate sampling architecture, a quantizer and a baseband converter. The intermediate frequency sampling architecture comprises receiving the input signal, passing the first intermediate frequency signal through a first filter characterized by steep selectivity and narrow bandpass, converting the filtered signal to a second intermediate frequency and passing the second intermediate frequency signal through a second filter having a bandpass characteristic, but without the steep selectivity characterizing the first filter. The radio further comprises a third filter following the baseband conversion which filters out adjacent channel harmonics to obtain a wanted data signal.

46 Claims, 8 Drawing Sheets

OTHER PUBLICATIONS

Hentschel, Tim et al,; "The Digital Front-End of Software Radio Terminals"; Article; Aug. 1999; pp. 40-46; vol. 6, No. 4; IEEE Personal Communications, IEEE Communications Society, USA.

Behbahani, Farbod et al.; "A 2.4 GHZ Low-if Receiver for Wideband WLAN in 0.6 UM CMOS-Part 1: Architecture and Front-End Circuits"; Article; Dec. 2000; pp. 63-71; vol. 54, No. 1-2; Microelectronic Engineering, Elsevier Publishers BV, Amsterdam, Netherlands.

Behbahani, Farbod et al.; "An Adaptive 2.4 GHZ Low-if Receiver in 0.6 UM CMOS for Wideband Wireless Lan"; IEEE ISSCC2000 Conference; Feb. 7, 2000; pp. 146-147.

\* cited by examiner

SYSTEM AND METHOD FOR AN IF-SAMPLING TRANSCEIVER

TECHNICAL FIELD OF THE INVENTION

The present invention is generally related to radio transceivers and, more particularly, to a system and method for an intermediate frequency transceiver.

BACKGROUND OF THE INVENTION

Wireless technologies have seen significant improvement over the past several years. All sorts of communications devices are now seen as potential candidates for the installation of a wireless communications device. From telephones, to computers, to personal digital assistants, the list of wireless devices grows everyday. As merely an example, Bluetooth wireless local area networks purport to enable the installation of wireless devices into everything from jewelry to major appliances.

The Institute of Electrical and Electronics Engineers (IEEE) has developed new wireless ethernet standards under 802.11, which includes IEEE 802.11a, some of which have begun gaining acceptance in the industry. Even further, the European Telecommunications Standards Institute (ETSI) has developed a high performance radio local area network (HiperLAN). HiperLAN has an embodiment called HiperLAN/2, which is seen as being in direct competition for the widespread acceptance of the IEEE 802.11a standard. Both transmit in the 5 GHz unlicensed national information infrastructure (UNII) frequency range, and have data rates of about 54 Mbps, and share other similarities at the physical layer. For example, both standards use orthogonal frequency division multiplexing. This means that the design of the radio architecture in both systems can have certain commonalities.

These commonalities are fortunate, because as transmission frequencies and data transfer rates rise, the complexity of the underlying radio architecture necessarily rises. The 802.11a and HiperLAN standards require especially complex solutions for the standards to be met. These complex solutions increase cost, which in turn increases the time needed to gain widespread acceptance in the industry.

Regular transceiver architectures employing I/Q down-converters cause problems in orthogonal frequency division multiplexing (OFDM) because they produce I/Q imbalance and DC offset, whereas this particular OFDM requires these values to be extremely low in order to obtain the specified signal to noise ratio (SNR). Intermediate frequency (IF) sampling architectures solve these problems, but introduce problems of their own, such as higher conversion speed causing increased analog-digital converter power consumption, and higher required selectivity to avoid both aliasing and image leakage. The higher selectivity requirement usually leads to using two intermediate frequency-surface acoustic wave (SAW) filters. These filters however, lead to increased noise figure and higher cost. Thus, an unaddressed need exists in the industry for an IF sampling architecture that obviates these problems.

SUMMARY OF THE INVENTION

The present invention provides a receiver portion of a transceiver that receives data via radio frequency transmission. The receiver comprises an IF sampling architecture, a quantizer, a baseband converter and a filter. The IF sampling architecture, wherein the IF sampling architecture receives the input signal, passes the input signal through a first filter, which is characterized by steep selectivity and narrow bandpass, converts the filtered signal to an IF signal and passes that signal through a second filter that has a bandpass characteristic, but without the steep selectivity characterizing the first filter. Then, a quantizer digitizes the filtered IF signal, and a baseband converter converts the digitized signal to a baseband signal. Finally, a third filter filters the adjacent channel harmonics from the baseband signal to produce a data signal.

The invention further includes a method for receiving a radio signal. The method comprises the steps of receiving an input signal. Then, the input signal is filtered by in a first filter having a response characterized by a steep selectivity and a narrow bandpass. The filtered signal is then modulated to produce an in-phase and a quadrature phase IF signal at an intermediate frequency. Next, the IF in-phase and quadrature phase signals are filtered in a channel selection filter and the results of the channel selection filter are added together. Finally, the method comprises digitizing the sum and modulating the digitized sum to obtain a baseband in-phase data signal and a baseband quadrature phase data signal.

These and other features and advantages of the present invention will become apparent from the following description, drawings and claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
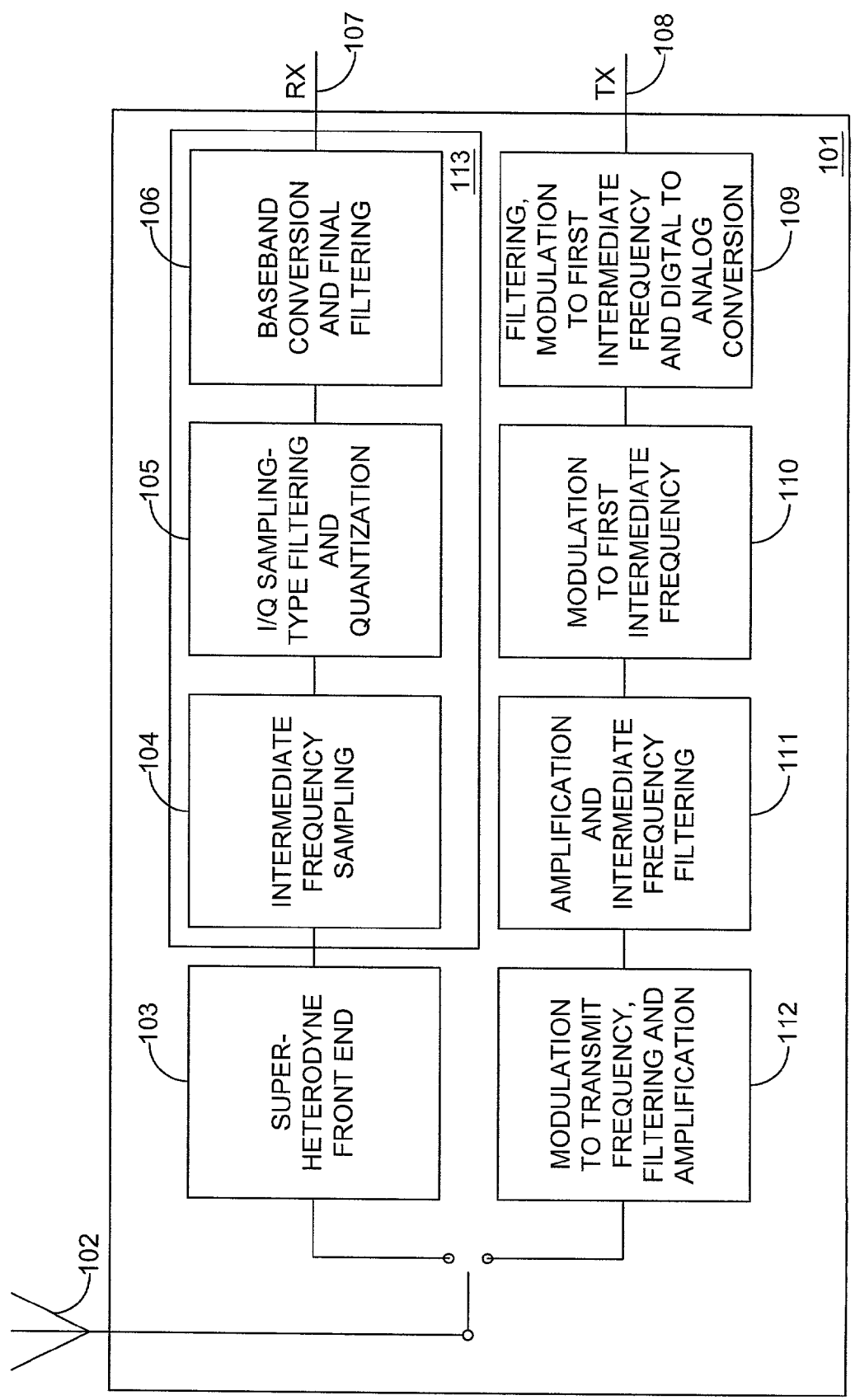
FIG. 1 shows a block diagram of a radio in which the transceiver of present invention resides.

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is particularly suited for use in conjunction with either the Institute of Electrical and Electronics Engineers (IEEE) 802.11a standard for wireless communications or the European Telecommunications Standards Institute (ETSI) High performance radio local area network (HiperLAN)/2 standard. However, the present invention is not limited to use with these standards and can be modified to be suitable for other uses, as will be understood by those skilled in the art in view of the present disclosure. Both standards are actually competing for acceptance by the industry and consumers. As such, an cost effective solution to the radio architecture needs of both standards is the most efficient solution to the problem.

Both of the systems operate on radio frequency bands in the range of 5.1 GHz to 5.9 GHz. Each band inside this range has eight separate channels, with each channel slightly overlapping the channels on either side. These channels on either side are referred to as "adjacent channels." The HiperLAN/2 standard has more stringent guidelines for the rejection of the adjacent channels than does the IEEE 802.11a standard. Thus, when the present invention was designed, it was designed to meet the higher signal to noise ratios (SNR) required by the HiperLAN/2 standard, which, of course, enables it to meet the less stringent SNR requirements of the IEEE 802.11a standard.

Each channel is about 17 MHz wide, has a frequency spacing of about 20 MHz and is made up of 52 narrow band carriers which are about 300 kHz wide. Each of the narrow band carriers operate on a direct sequence spread spectrum protocol. These narrow band carriers use a coded orthogonal frequency division multiplexing scheme (COFDM) to encode the data that is being sent. All of the narrow band carriers are used, such that the system can send a number of data signals in parallel. As one skilled in the art will recognize, the parallel transmission of data can occur much faster than transferring the data in sequence.

Common architectures used for these wireless systems employ an I/Q down converter. However, this causes problems with respect to OFDM radios. In these radios, the SNR is required to be on the order of about 30 dB or greater after analog to digital (AD) conversion. This requirement, because of the high frequency signals involved, requires that both the I/Q imbalance and DC-offset values in the radio be extremely low. The only way to solve this problem is through the use of complex compensation algorithms. These complex compensation algorithms in turn increase the cost of the radio.

In accordance with the present invention, generally IF sampling architecture digitizes the intermediate frequency signal with an AD converter clocked at a rate four times higher than its center frequency. The architecture of the present invention solves both of the aforementioned problems because DC offset is non-existent in the approach taken by the present invention, and the required I/Q imbalance is obtained by digitally converting the IF signal to baseband.

Sampling at four times the rate of the center frequency, the digital conversion to baseband is very cost effective to build. However, clocking the AD converter at this rate usually leads to higher power consumption. Moreover, higher selectivity is employed in the filtering steps to avoid both aliasing and image-leaking. The higher selectivity requirement most often leads to the use of two intermediate frequency surface acoustical wave (SAW) filters. These types of systems usually also require a "super-heterodyne" front end to convert the incoming signal at the 5–6 GHz range to a first intermediate frequency of about 1.5 GHz. However, the use of the extra SAW filter usually provides more selectivity than is necessary for the reception of the signal.

Using the IF sampling architecture of the present invention, the first intermediate frequency signal is down converted to a second intermediate frequency. The second intermediate frequency is a design selection. As with all selections, there is a tradeoff. Here, the tradeoff is between performance and required selectivity. As was mentioned before, in accordance with this embodiment of the present invention, the sampling rate preferably is 4 times the second IF in order to provide high quality digital down conversion. Increasing the second intermediate frequency will necessitate a higher sampling rate, which might increase power consumption. Alternatively, lowering the second intermediate frequency might bring the image and alias frequencies closer to the wanted signal, thus increasing the required selectivity of the filtering devices. The present invention balances these tradeoffs in order to optimize performance and power consumption. One solution posed would be to under-sample the signal at a higher second intermediate frequency. However, this raises the problem of noise folding, wherein the noise figure increases. The manner in which these problems are handled to achieve an optimum solution will now be described with respect to example embodiments of the present invention.

Referring now to FIG. 1, shown is a block diagram of the radio architecture in which the present invention resides. Wireless networks communicate from various endpoints to another endpoint that is typically hardwired to a network. Each of these wireless endpoints has a radio 101 installed into the endpoint to enable it to communicate with any of the other devices on the network. The radio communicates with other radios on the network via radio frequency signals received and transmitted over an antenna 102. In this embodiment, the radio is designed for the industry standards IEEE 802.11a and HiperLAN/2, which both operate in about the 5.1–5.9 GHz range. In order to operate more efficiently, an incoming radio signal is first down converted to an intermediate frequency with a super-heterodyne front end 103. If the incoming RF signal is not down converted, the system would require a large amount of power to operate because of the relatively high clocking frequency that would be required. Again, it should be understood by one skilled in the art that the operating frequencies described herein are merely examples of possible operating environments in which the present invention can be used, and that there are other environments in which the present invention can be used without departing from the teachings contained herein.

After down converting, the present invention uses a intermediate frequency sampling architecture 104. This is intended to filter out the alternate, adjacent channels, and the alias and image channels that result from the modulation of the signal. Optionally, an I/Q sampling 105 architecture can be added. This will provide some extra selectivity by slightly amplifying the wanted signal while suppressing some of the unwanted signals. The signal is also digitized at stage 105 prior to baseband conversion and a final filtering 106 of the unwanted harmonics, resulting in a received signal (Rx) 107.

On the transmission side, what is close to a mirror image of the receiver exists. The transmitted signal (Tx) 108 is first filtered and modulated from the baseband signal into a second intermediate frequency and then converted from a digital to an analog signal by circuit 109. The signal is then modulated to a first intermediate frequency by modulation circuitry 110. The signal is then amplified and filtered at the first intermediate frequency by amplification/filtering circuitry 111. Finally, the signal is modulated up to transmission frequency, filtered and amplified to transmission power by circuit 112. The signal is then transmitted to another endpoint enabled with a similar radio to communicate via radio frequency signaling. The focus of the present invention is on the receiver portion 113 of the transceiver.

Figure 2:
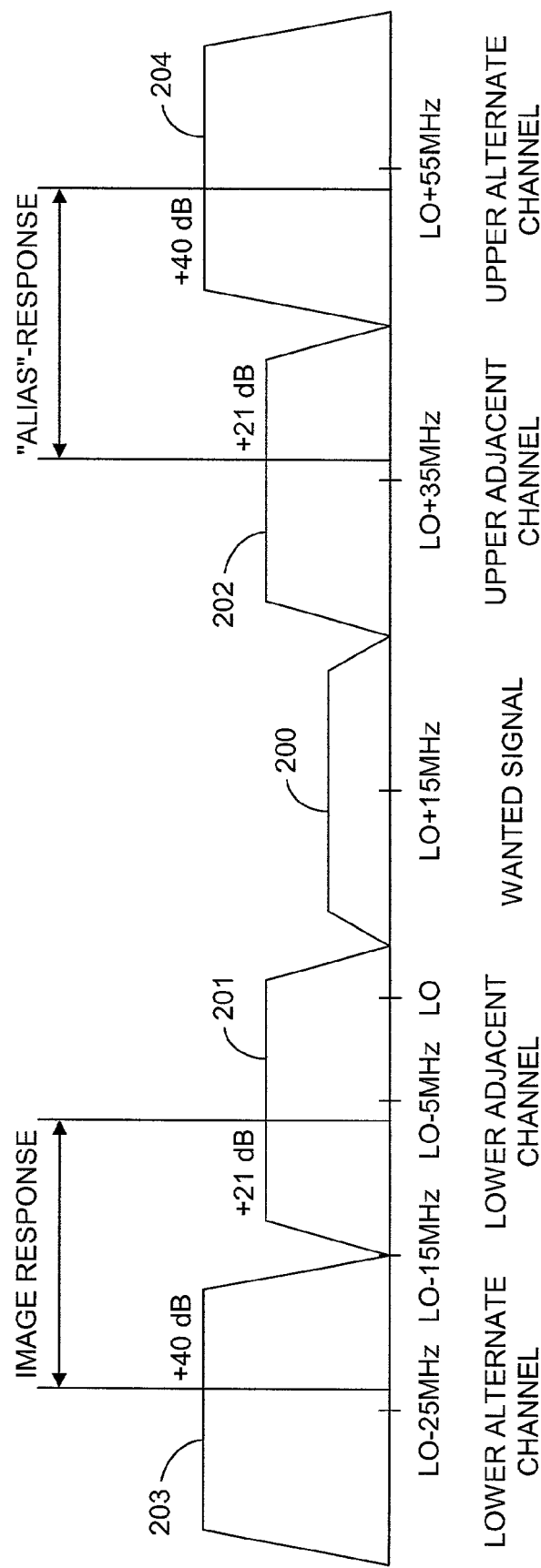
FIG. 2 shows a graph illustrating the signal strength requirements of the IEEE 802.11a and HiperLAN standards.

Referring now to FIG. 2, shown is a representation of the signal strength at the frequencies surrounding the wanted signal. As can be seen, the wanted signal 200 is at the local oscillator frequency (LO) plus 15 MHz. This frequency was chosen according to the frequency response of an intermediate SAW filter. Generally, the SAW filters used for this implementation show a flat frequency response for signals of about 20–30 MHz to either side of the center frequency. One skilled in the art should understand, however, that in accord with the previous paragraphs, this frequency is chosen according to design preferences, and thus could vary widely according to preference and use. The adjacent channels 201, 202 signal strength is shown at +21 dB because according to the standard, the adjacent channels 201, 202 can be up to 21 dB stronger than the strength of the wanted signal 200. Since the required SNR for the wanted signal 200 is 30 dB, this means that there must be at least 51 dB rejection at the adjacent channels 201, 202. Similarly, the alternate channels 203, 204 are shown at +40 dB, and therefore the required frequency rejection for the alternate channels 203, 204 is 70 dB. With respect to the image and alias responses shown, assuming half of the alternate channel power passes through to the image and alias channels, that equates to 3 dB loss, which means the image and alias channels are at +37 dB relative to the wanted signal. In turn, the system requires that the SNR of the wanted signal at least 30 dB, so the required selectivity at these channels is 67 dB.

Figure 3:
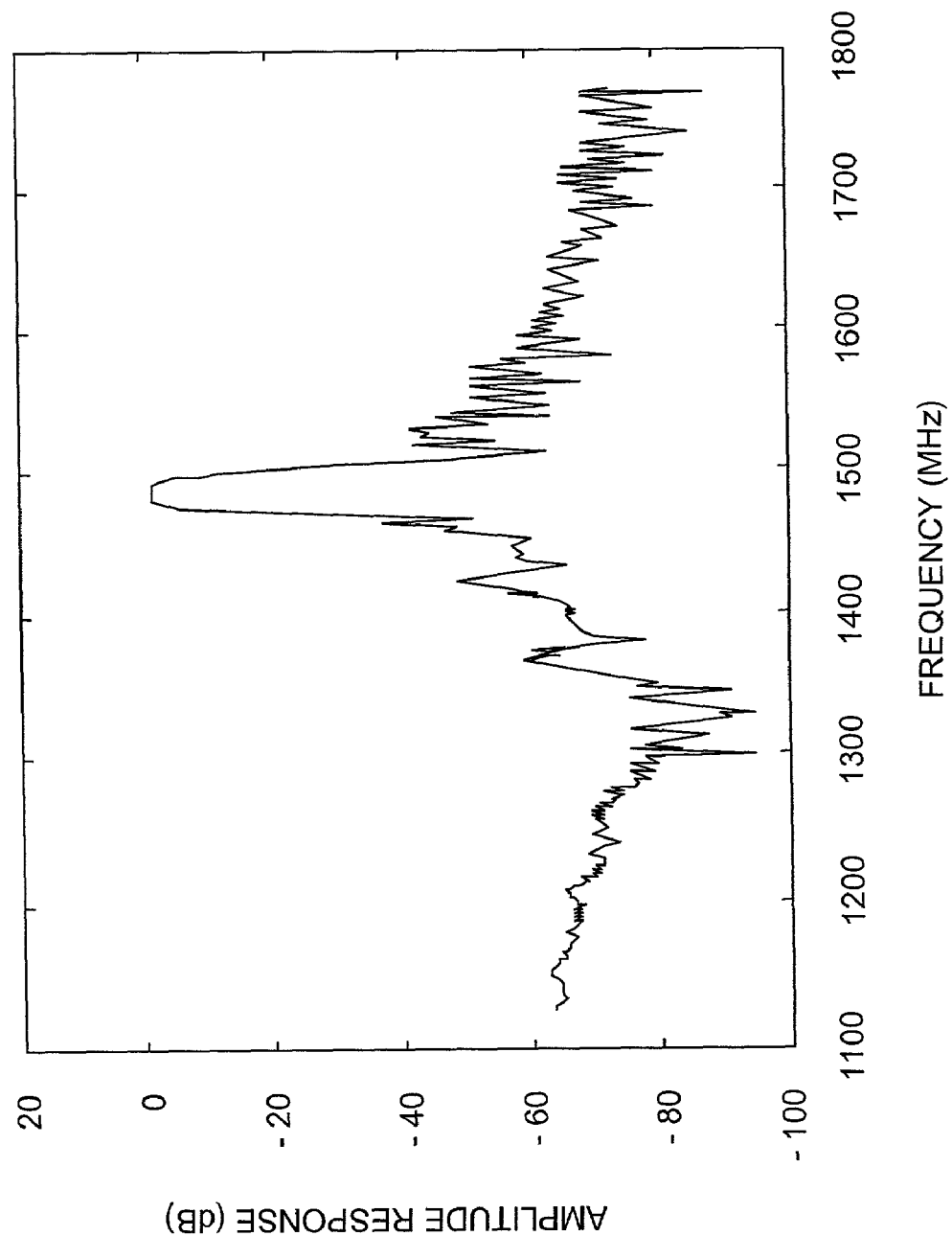
FIG. 3 shows a graph illustrating the transfer function of an intermediate frequency SAW filter used in radio design.

By closely observing the transfer function in FIG. 3 of the intermediate frequency SAW filter applied at the first stage, the rejection obtained at relevant frequencies can be ascertained. Assuming an appropriate center frequency (in the 1.5 GHz range for this embodiment), the lower alternate channel sees 56 dBs of attenuation, the lower image channel sees 44 dBs of attenuation, the lower adjacent channel sees 15.7 dBs of attenuation, the upper adjacent channel sees 16.5 dBs of attenuation, the upper alias channel sees 44 dBs of attenuation, and the upper alternate channel sees 41.7 dBs of attenuation.

Figure 4:
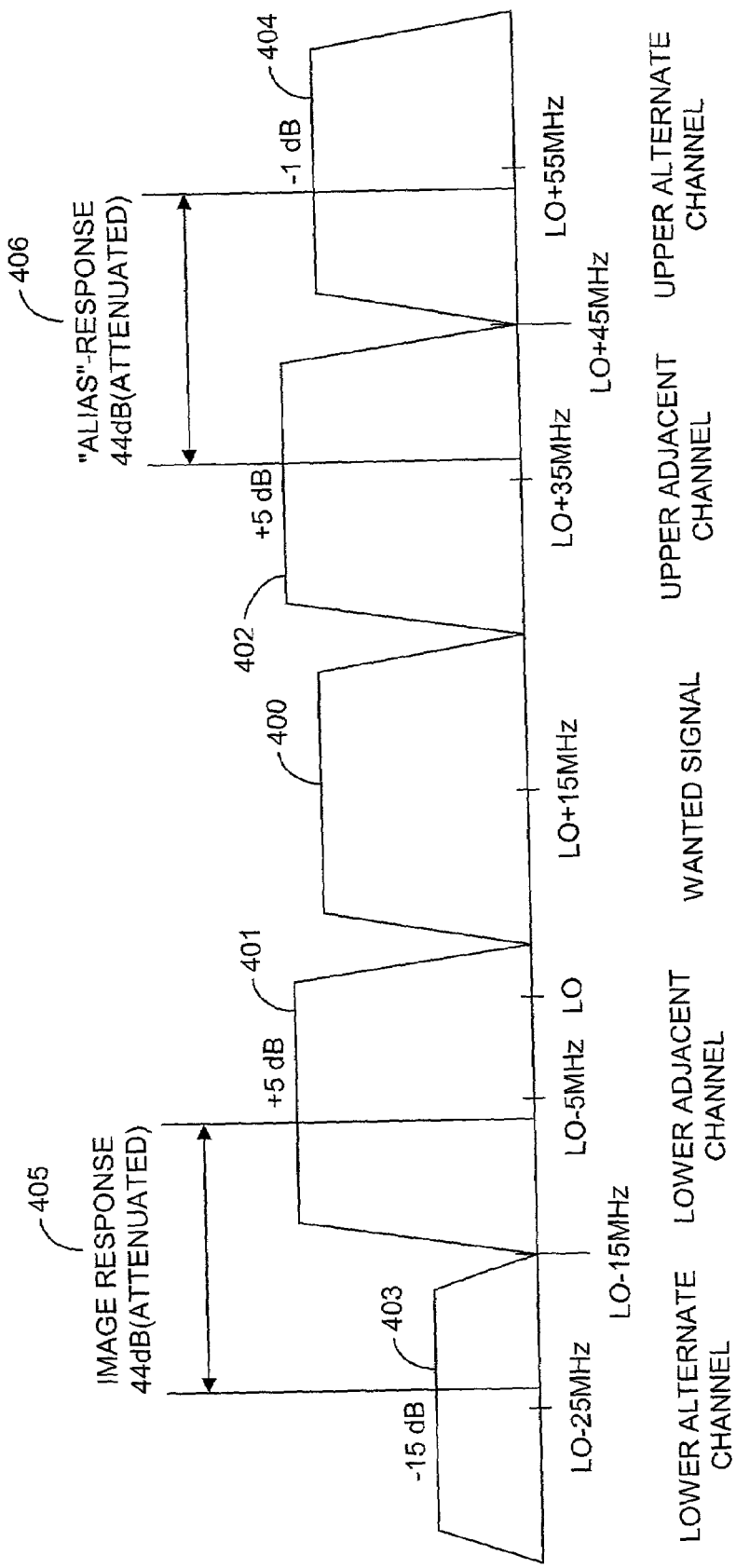
FIG. 4 shows a graph illustrating the signal strength requirements of the IEEE 802.11a and HiperLAN standards after taking into account the application of the intermediate frequency SAW filters.

Now referring to FIG. 4, shown is the signal strength on the various channels in relation to the wanted signal 400 after the application of the intermediate frequency SAW filter. As is shown, the lower adjacent channel 401 and upper adjacent channel 402 are now 5 dBs stronger than the wanted signal 400. Further, the lower alternate channel 403 is now 15 dBs weaker than the wanted signal 400, while the upper alternate channel 404 is 1 dB weaker than the wanted signal. With respect to the image 405 and alias response 406 components of the signal, these have seen 44 dBs of attenuation, so 23 more decibels of attenuation are needed to suppress these to the required levels. Regarding the alternate and adjacent channels (both lower and upper), each of these signals are also required to be suppressed to −30 dBs relative to the wanted signal.

In order to avoid the second intermediate frequency SAW filter, another way of providing the required selectivity is needed in order to provide the required selectivity at the specified frequencies. Active bandpass filters are very noisy and are difficult to implement at high IF frequencies, and applying the required LC-filter would drastically increase the number of external components. Thus, a way to avoid the application of a second intermediate frequency SAW filter is to add the requisite selectivity at the second IF.

Figure 5:
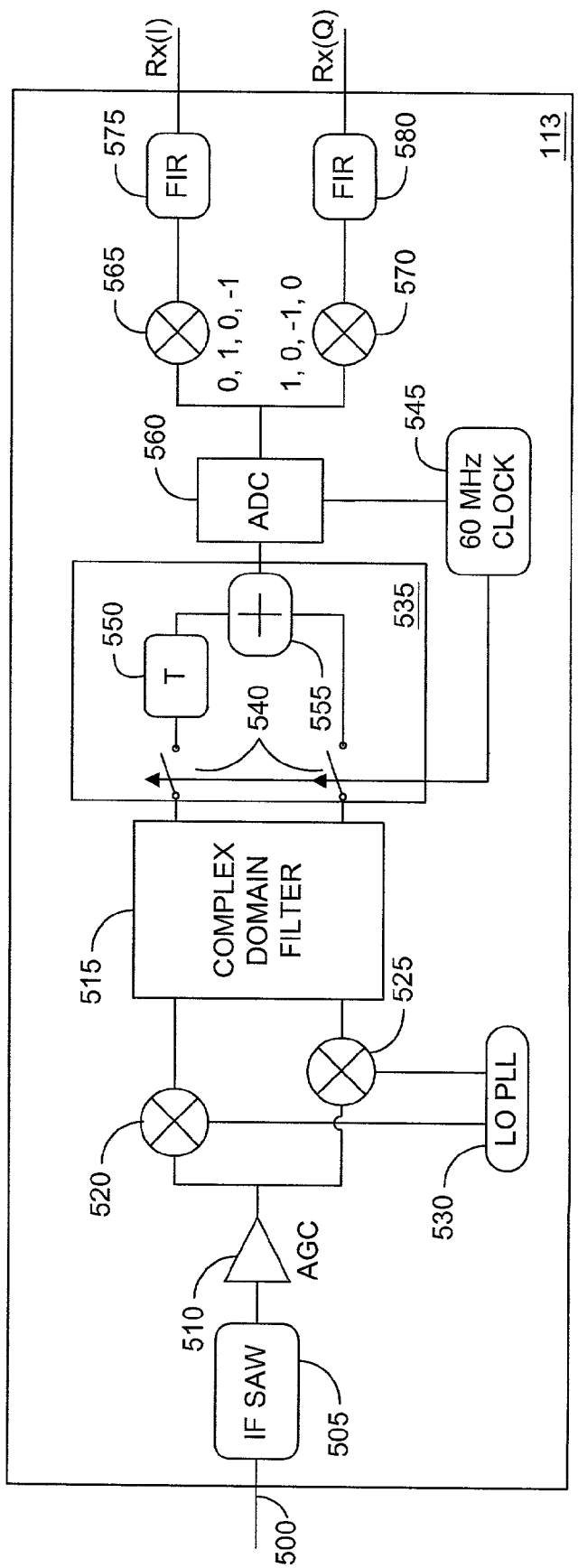
FIG. 5 shows a schematic diagram of the radio receiver of the present invention.

Referring now to FIG. 5, shown is a schematic diagram of one embodiment of the radio receiver portion 113. As shown in FIG. 1, the solution in the present embodiment is the application of an I/Q low IF stage and a I/Q sampling architecture. I/Q sampling means that the pair of signals (in-phase and quadrature phase components of the input signal) are sampled at four times their center frequency. One of the signals is then delayed by a period, before the signals are added together. The I/Q sampling stage provides a bit of extra filtering for both the adjacent channels and the image channel. Moreover, instead of employing the second IF SAW filter, the system uses a complex domain filter 515, which costs a fraction of what an IF SAW filter costs and can be easily integrated. Thus the second intermediate frequency SAW filter is inefficient and unnecessary, and therefore is not used.

As can be seen in FIG. 5, the system assumes the availability of a super-heterodyne front end 103 (FIG. 1), which converts the 5–6 GHz signal 500 down to a first intermediate frequency of 1.5 GHz. Based upon this assumption, the first stage in the receiver applies an intermediate frequency SAW filter 505 to the input signal 500. As discussed above, the intermediate frequency SAW filter 505 provides an excellent transfer function with a narrow bandpass and steep selectivity outside the bandpass range. For example, the narrow bandpass of this filter is in the range of 30–40 MHz, while the steep selectivity of the filter is related to the narrow bandpass in that it provides for a more precise range with regard to the bandpass characteristic of the filter. The terms narrow bandpass and steep selectivity are relative terms being defined in their relationship to most active filters having a bandpass characteristic. In this embodiment, the bandpass range must be so selective because of the close proximity of the channels. However, in other embodiments corresponding to other communication standards, the channels may not be in such close proximity and a less steep bandpass filter may provide the requisite selectivity for input into the IF sampling architecture. After the input signal has been filtered by the IF SAW filter 505, the signal is passed through an automatic gain control amplifier 510. This amplification stage 510 assures that the signal being fed into the later stages is of a relatively constant amplitude signal.

The rejection requirements outlined above can be met by analog and digital filtering in baseband. However, the problems with the image and alias channels are not addressed when the filtering is done in baseband. When converting the signal down to baseband, the modulation shifts the image channel into the wanted signal. Since the modulation causes the image channel to move into the wanted signal, the image channel should be removed as much as possible prior to baseband sampling. Assuming half of the alternate channel power passes through to the image channel, the image signal strength will be 37 dB, because half power is equivalent to −3 dB on the decibel scale. Thus, the removal of the image channel requires a selectivity of 67 dB at 30 MHz from the alternate channel. However, again, it should be understood by one skilled in the art that these decibel ratings are provided by the specifications of the HiperLAN/2 and 802.11a standards, and that the invention is not limited these standards.

In order to meet the requirements here, this embodiment converts the signal down to a second intermediate frequency prior to the second stage of filtering, as discussed above with reference to FIG. 2. As indicated above, in the IF sampling architecture of the present invention, a second intermediate frequency is chosen. For this embodiment, 15 MHz has been chosen as the second intermediate frequency. At the chosen frequency, a regular active complex domain filter 515 can be applied.

In converting the signals down to this second intermediate frequency, two multipliers 520, 525 are applied, with the output of the amplifier 510 feeding one input of each of the multipliers 520, 525, and with a local oscillator 530 signal feeding the other input of each of the multipliers 520, 525. The first multiplier 520 converts the output of the amplifier 510 to an in-phase component of the input signal, while the second multiplier 525 converts the amplifier 510 output to a quadrature phase component. Next, a filter 515 is applied to add the requisite selectivity at the second IF. The complex domain filter 515 must be able to pass the wanted signal while rejecting the image and alias signals to the required degree. Restrictions in the use of complex domain filters 515 most often lie in the requisite Q factor and the maximum image rejection that can be achieved by the filter 515, which is given by I/Q balancing in the filter 515. The Q factor required for the present application, however, is quite reasonable because the channel bandwidth can be chosen at 17 MHz, with a center frequency of 15 MHz.

Mismatches prior to a local oscillator generation 530 and modulation by multipliers 520, 515 may cause leakage from the image band onto the wanted second IF signal. Once such leakage occurs, it is difficult to undo. Therefore, it is important to try to eliminate the leakage prior to it propagating through to the next modulation. However, the importance of eliminating the leakage decreases according to the stage of the device. If the image signal is highly attenuated at the first stage of the device, there is, by definition, less signal to "leak" onto the wanted signal at the later stages.

Noting that the first intermediate frequency SAW filter 505 has already attenuated the image frequency by about 44 dBs, it becomes apparent that, by inspecting the SNR requirements, the attenuation should be in the neighborhood of 23 dBs. Further, a complex domain filter 515 can reasonably provide a rejection in the neighborhood of 25 to 30 dBs. Thus, the image channel can be reduced to the required degree by complex domain filtering 515 at the second intermediate frequency.

Figure 6:
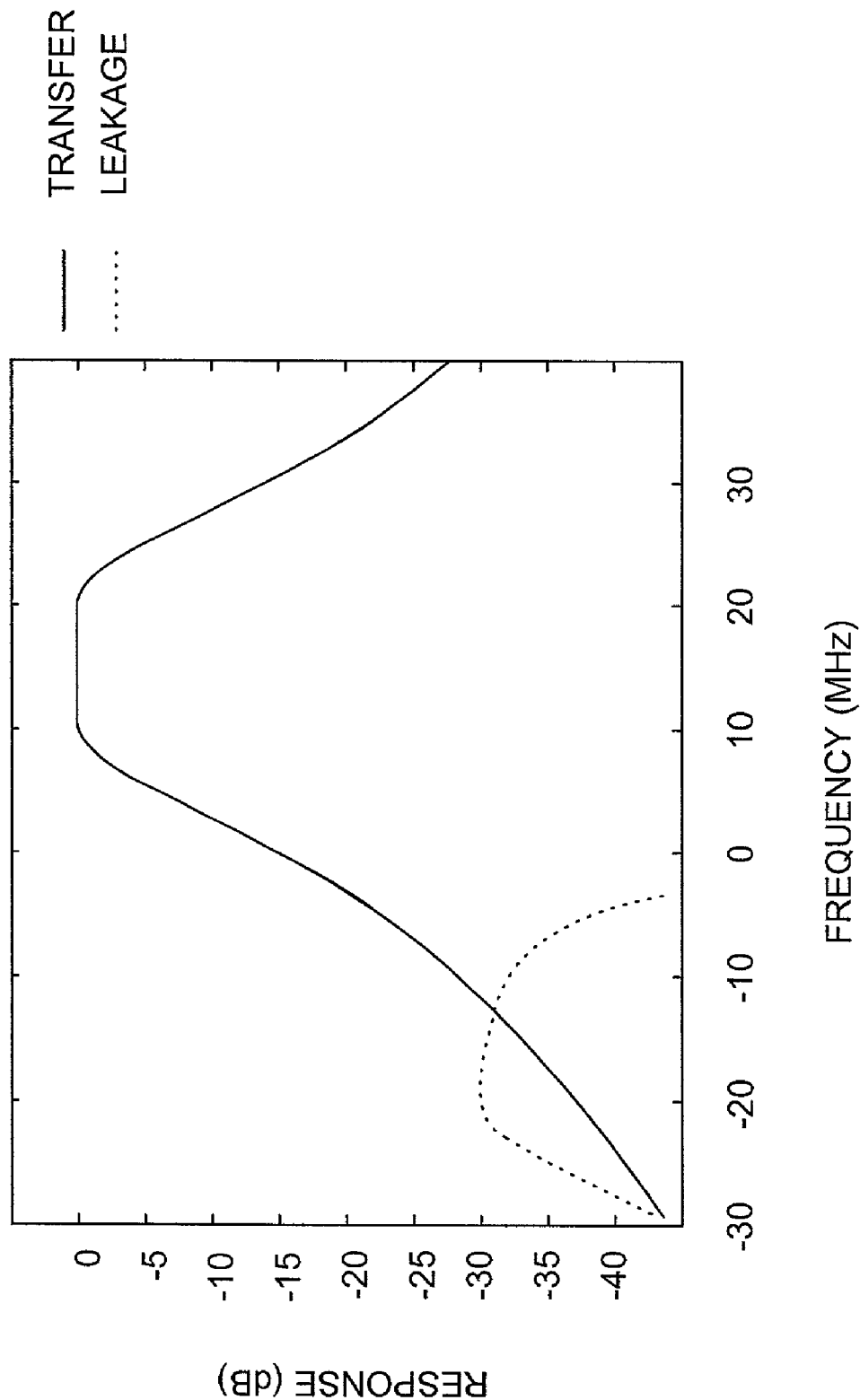
FIG. 6 shows a graph illustrating the transfer function of a complex domain filter used in conjunction with the present invention.

Referring now to FIG. 6, the transfer function of the complex domain filter (a third order butterworth filter) can be seen. With regard to the transfer function of the filter shown in FIG. 5, it should be noted that the center frequency is 15 MHz and the bandwidth is 17 MHz. Also shown is a leakage curve indicating the amount of power leaking onto the channel at the opposite side of the frequency axis (i.e. at −15 MHz center frequency). This leakage assumes that the in-phase and quadrature phase signals have an amplitude mismatch of +/−2% with respect to one another.

Referring back to FIG. 5, an I/Q sampling architecture 535 was employed in order to obtain some extra selectivity at the image and alias channels. As was discussed above, the I/Q sampler operates by sampling 540 the signal at 4 times the second intermediate frequency, or 60 MHz, as indicated by clock 545. A delay element 550 then delays one component of the signal for one clock period. After delaying the signal, an adder 555 then adds the two component signals back together. Finally, after adding the component signals together, the sum is quantized using an analog-to-digital converter (ADC) 560. The ADC 560 is clocked using the same 60 MHz clock 545 as was used for the sampling 540. The I/Q sampling operation performed by circuit 535 yields a result wherein the wanted signal is amplified from the I/Q combination, while providing a notch type attenuation for the alias frequency. Ultimately, the I/Q sampler adds about 11.5 dBs of selectivity to the system over the image channel frequencies, while adding 5 dBs of attenuation to the adjacent channels.

After the signal has been digitized, it can be converted to baseband by multipliers 565, 570. The baseband signal is derived by multiplying the output of the ADC 560 by a string of coefficients. For the in-phase baseband conversion, the digital signal is multiplied by the string 0, 1, 0, −1 by multiplier 565, while the quadrature phase baseband conversion 570 is given by multiplying the digital signal by 1, 0, −1, 0 using multiplier 570. Each of these baseband signals is then filtered by a finite impulse response filter 575, 580 to eliminate any remaining noise.

Figure 7:
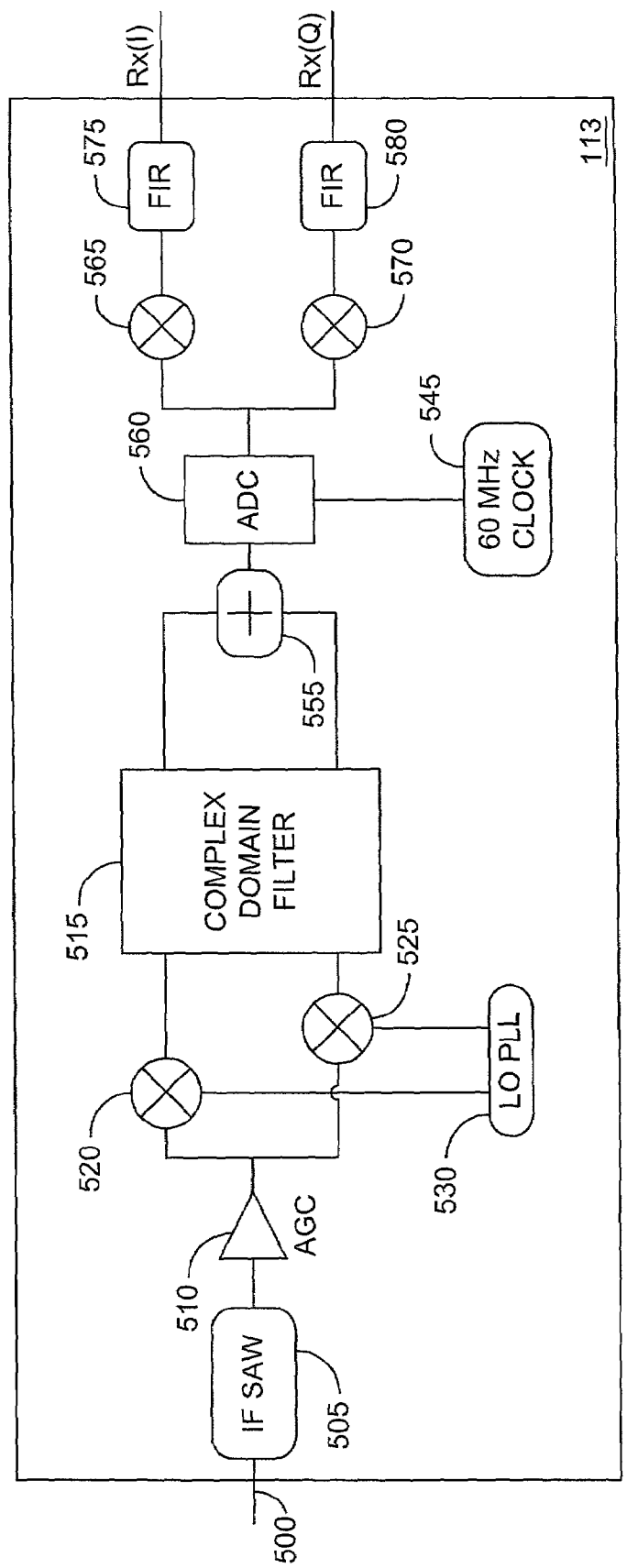
FIG. 7 shows a schematic diagram of the present invention with reduced complexity.

Referring now to FIG. 7, shown is an embodiment of the radio receiver of the present invention having reduced complexity. This solution sacrifices some of the performance quality for a more efficient solution in terms of cost. As can be seen in FIG. 7, the solution eliminates the delay element 550 and sampling element 540 after the complex domain filter 515 shown in FIG. 5. Instead, the in-phase and quadrature phase signals are added by adder 555 together, without the phase shift. Since the quadrature and in-phase signals are no longer efficiently combined, there is less amplification of the signal, resulting in a wanted signal that is weaker. Moreover, there is no notch effect gained, so the extra attenuation of 5 dBs at the adjacent channel and 11 dBs at the image channel is no longer a part of the system. As a result, higher order finite impulse response filters 575, 580 are used. However, other filters provide similar characteristics may instead by used at the final stage following conversion to baseband.

Figure 8:
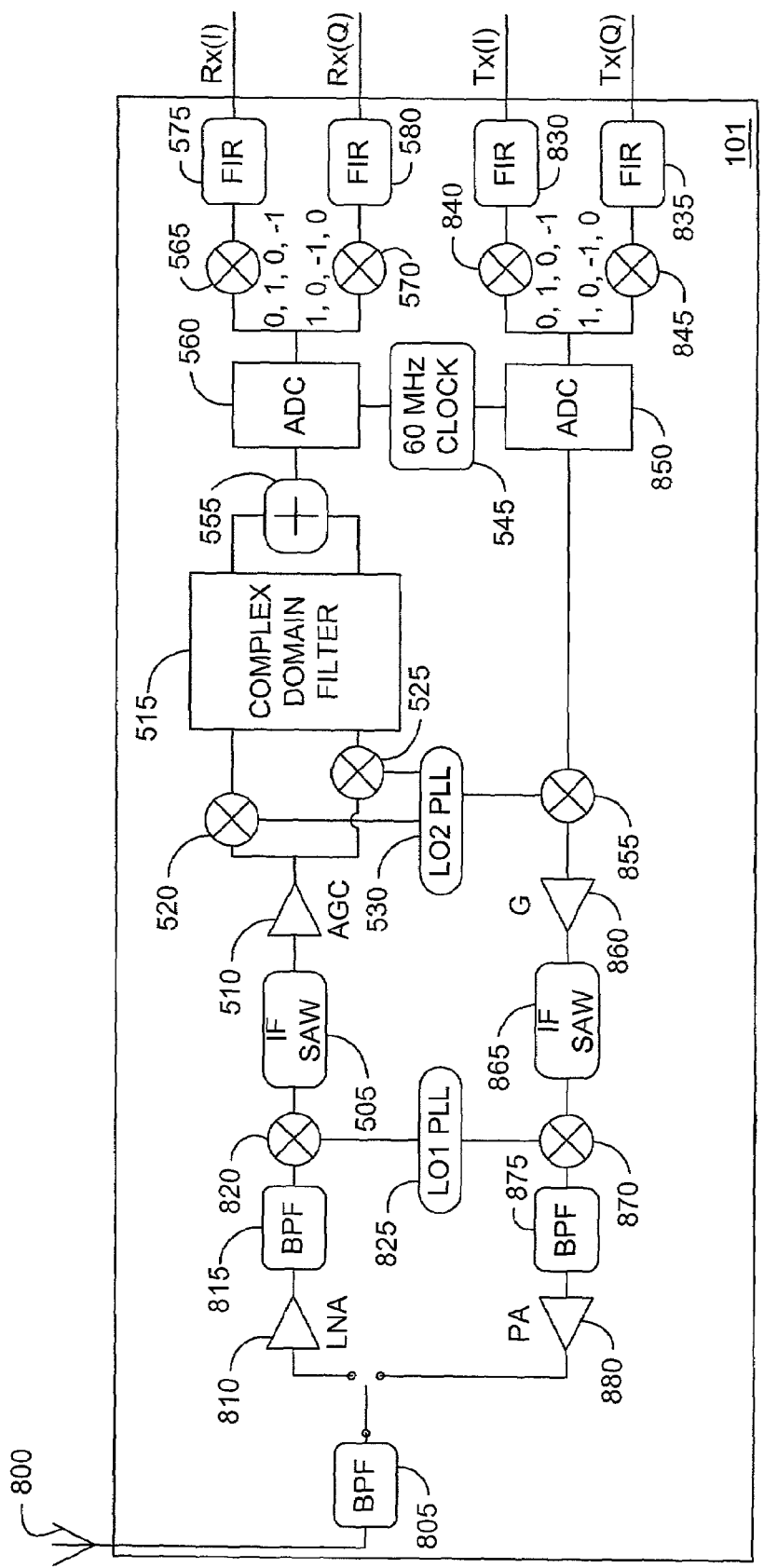
FIG. 8 shows a schematic diagram of the radio of the present invention including a transmitter that operates in accord with the receiver of previous figures.

Referring now to FIG. 8, shown is a schematic diagram of the transceiver of the present radio architecture. With respect to the upper path of the signal, shown is the reduced complexity implementation of the receiver architecture, including the front end conversion element 820 that converts the incoming radio frequency signal to the first intermediate frequency. The signal is first received through the antenna 800 and passes through an initial bandpass filter 805. A switch is shown to represent the different input and output paths of the radio signal. On the input side, the signal passes through a low noise amplifier 810 and a second bandpass filter 815 prior to being modulated by modulator 820 by multiplying the input signal by a first local oscillator in order to convert the signal to the first intermediate frequency, 1.5 GHz. The signal then passes through the single intermediate frequency SAW filter 505 and an automatic gain control (AGC) amplifier 510 before being converted by converter 520, 525 to the second intermediate frequency comprising both quadrature and in-phase components. The conversion is performed by multiplying with multiplier 520, 525 the output of the AGC with a second local oscillator signal generator 530. At the second intermediate frequency both quadrature and in-phase components are passed through a complex domain filter 515. The outputs, in-phase and quadrature phase components, of the complex domain filter 515 are then summed by adder 555 and digitized by ADC 560. The signal is then converted to baseband by converters 565, 570 which multiply the signals by the series 0, 1, 0, −1 and 1, 0, −1, 0 to get in-phase and quadrature phase representations, respectively. The signals are then filtered in a finite impulse response filter 575, 580 and fed into a data slicer, where the information contained within the signal is retrieved.

With respect to the lower path of the transceiver, shown is the transmitter. The transmitter is close to a mirror image of the receiver, without the more complex filtering devices. First, the signal is transferred into the transceiver in baseband. Then the baseband signal is passed through a finite impulse response filter 830, 835 before conversion by converters 840, 845 from baseband to the second intermediate frequency. The conversion by converters 840, 845 to the second intermediate frequency is performed by multiplying the in-phase and quadrature components of the signal by the series comprising 0, 1, 0, −1 and 1, 0, −1, 0, respectively. The signal is then combined and converted to analog by a digital-to-analog converter (DAC) 850 for transmission. The analog signal is then converted up by converter 855 to the first intermediate frequency by multiplication with the second local oscillator 530 signal. The signal is then amplified by amplifier 860, fed through an output SAW filter 865, and converted by converter 870 to the transmission frequency. At the transmission frequency, the signal is passed through a bandpass filter 875. The signal is finally passed through a power amplifier 880 before transmission. The power amplifier 880 can amplify to saturation in order to get the most transmission power possible out of the transmitter. On transmission, the switch is on the lower path and the signal passes through a final bandpass filter 805 before being transmitted.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing from the scope of the invention. All such modifications and variations are intended to be included herein within the scope of this disclosure and the present invention.

What is claimed is:

1. An intermediate frequency sampling architecture, comprising:
   a modulator, the modulator receiving an input signal and modulating the input signal to an intermediate frequency;
   a first filter, the first filter receiving the intermediate frequency signal and passing the intermediate frequency signal through a filter having a bandpass characteristic, producing a filtered signal;
   an I/Q sampler, the I/Q sampler receiving the filtered signal, and providing the filtered signal with increased selectivity, the I/Q sampler comprising a sampling device, a delay element, and an adder, the sampling device sampling the output of the first filter, the delay element delaying one of the in-phase and quadrature phase components of the sampled signal, thereby producing a delayed component and an un-delayed component, the adder receiving the delayed component and the un-delayed component and summing the delayed component and the un-delayed component to produce an input to a quantizer; and
   the quantizer receiving and digitizing the increased selectivity filtered signal to produce a digitized signal ready for baseband conversion.

2. The intermediate frequency sampling architecture of claim 1, wherein the intermediate frequency sampling architecture further comprises a second filter, the second filter receiving the input signal and filtering the input signal prior to modulating the input signal to an intermediate frequency.

3. The intermediate frequency sampling architecture of claim 1, wherein the I/Q sampler samples the output of the first filter at 4 times the second intermediate frequency.

4. A radio, comprising:
   a first filter, the first filter receiving an input signal, wherein the first filter has a transfer function characterized by steep selectivity and narrow bandpass range and producing a first filtered signal;
   an amplifier, receiving the output of the first filter;
   an intermediate frequency sampling architecture having an I/Q sampler, the intermediate frequency sampling architecture receiving an input signal, modulating the first filtered signal to an intermediate frequency signal by multiplying the output of the amplifier by a second local oscillator signal, passing the intermediate frequency signal through a second filter having a bandpass characteristic, but without the steep selectivity characterizing the first filter, producing a second filtered signal, and providing the second filtered signal with increased selectivity before digitizing it to produce a digitized signal;
   a baseband converter, the baseband converter converting the digitized signal to a baseband data signal; and
   a third filter, the third filter receiving the baseband data signal and removing the remaining interference in channels adjacent to the baseband data signal.

5. The radio of claim 4, wherein the I/Q sampler comprises:
   a sampling device, sampling the output of the second filter at 4 times the second intermediate frequency;
   a delay, delaying one of the in-phase and quadrature phase components of the sampled signal; and
   an adder to sum the delayed component and the un-delayed component to produce an input to the quantizer.

6. The radio of claim 4, wherein the radio further comprises a super-heterodyne front end, creating the input signal, comprising:
   an antenna, the antenna receiving an input signal via radio frequency in at least IEEE 802.11a or HiperLAN/2 format;
   a low noise amplifier, the low noise amplifier amplifying the input signal;
   a bandpass filter, the bandpass filter receiving the amplified input signal and filtering the amplified input signal; and
   a multiplier, the multiplier receiving the output of the bandpass filter and multiplying the output of the bandpass filter with a first local oscillator to produce the input signal at the first intermediate frequency for input into the intermediate frequency sampling architecture.

7. The radio of claim 4, wherein the first filter is a surface acoustic wave filter.

8. The radio of claim 7, wherein the amplifier is an automatic gain control amplifier, maintaining a relatively constant output level.

9. The radio of claim 8, wherein the second filter is a complex domain filter with a butterworth bandpass characteristic, having a center frequency of 15 MHz and a bandwidth of 17 MHz.

10. The radio of claim 9, wherein the second multiplier multiplies the output of the analog to digital converter by the series 0, 1, 0, −1 to derive the baseband in-phase component signal and by the series 1, 0, −1, 0 to derive the baseband quadrature component signal.

11. A radio, having a receiver comprising:
   a first filter, the first filter receiving an input signal, the first filter having a response characterized by steep selectivity and narrow bandpass;

an amplifier, the amplifier amplifying the output of the first filtering device;

a first modulator, the first modulator converting the output of the amplifier to an in-phase signal at a second intermediate frequency;

a second modulator, the second modulator converting the output of the amplifier to a quadrature phase signal at the second intermediate frequency;

a second filter, the second filter receiving the in-phase and quadrature phase signal, the second filter having a bandpass characteristic, without the steep selectivity of the first filtering device;

an I/Q sampler, the I/Q sampler receiving the outputs of the second filter and delaying one of the in-phase and quadrature phase components, before adding them back together;

a quantizer, converting the analog output of the I/Q sampler into a digital signal; and a third modulator and a fourth modulator, the third and fourth modulators receiving the digital signal and converting it to a baseband in-phase signal and baseband quadrature phase signal, respectively.

12. The radio as defined in claim 11, wherein the radio further comprises:

a third filter, the third filter receiving the baseband in-phase signal and removing the remaining interference in channels adjacent to the baseband in-phase signal; and a fourth filter, the fourth filter receiving the baseband quadrature phase signal and removing the remaining interference in channels adjacent to the baseband quadrature phase signal.

13. The radio as defined in claim 11, wherein the first filter comprises an intermediate frequency surface acoustical wave filter.

14. The radio as defined in claim 13, wherein the second filter comprises a complex domain filter having a butterworth characteristic, with a center frequency of 15 MHz and a bandwidth of 17 MHz.

15. The radio as defined in claim 14, wherein the amplifier is an automatic gain control amplifier, which keeps the output level nearly constant.

16. The radio as defined in claim 15, wherein the I/Q sampler comprises:

a first and second sampler to sample the in-phase and quadrature phase output of the complex domain filter at a frequency four limes the intermediate frequency;

a delay device, the delay device receiving the in-phase sampled signal delaying the in-phase sampled signal for a period of time; and an adder, receiving the delayed in-phase sampled signal and the sampled quadrature phase signal, the adder adding the sampled delayed in-phase signal to the sampled quadrature phase signal.

17. The radio as defined in claim 16, wherein the delay device is a shift register.

18. The radio as defined in claim 17, wherein the quantizer is an analog to digital converter, operating at a clock frequency equal to the first and second sampler.

19. The radio as defined in claim 18, wherein the first and second modulators are multipliers, multiplying the output of the automatic gain control amplifier by a local oscillator phase-locked loop in order to derive the in-phase and quadrature phase signals.

20. The radio as defined in claim 11, wherein the radio further comprises a transmitter comprising:

a fifth and sixth filter, the fifth and sixth filters receiving a baseband in-phase transmit signal and a baseband quadrature phase transmit signal, respectively, and filtering the in-phase and quadrature phase transmit signals;

a fifth and sixth modulator, the fifth and sixth modulators receiving the output of the fifth and sixth filters, respectively, and converting the output of the fifth and sixth filters from baseband to the second intermediate frequency and adding the signals together;

a digital to analog converter, receiving the output of the fifth and sixth modulators and creating an analog signal;

a seventh modulator, the modulator transforming the analog signal to a first intermediate frequency transmit signal;

a second amplifier, the amplifier amplifying the first intermediate frequency transmit signal;

a seventh filter, the seventh filter receiving the output of the second amplifier, and being characterized by steep selectivity and narrow bandpass;

an eighth modulator, the eighth modulator receiving the output of the seventh filter, and transforming the signal to a transmit frequency; and a third amplifier, the third amplifier amplifying the output of the eighth modulator to transmission power; an eighth filter, the eighth filter receiving the output of the third amplifier, the eighth filter having a bandpass characteristic and passing the signal to an antenna for transmission.

21. The radio as defined in claim 20, wherein the fifth and sixth filters are finite impulse response filters.

22. The radio as defined in claim 21, wherein the transmit frequency is in the range of about 5.1 GHz to about 5.9 GHz, the first intermediate frequency is approximately 1.5 MHz, and the second intermediate frequency is approximately 15 MHz.

23. The radio as defined in claim 22, wherein the digital to analog converter is clocked by clock having around a 60 MHz sampling period.

24. The radio as defined in claim 23, wherein me seventh filter is an intermediate frequency surface acoustical wave filter.

25. The radio as defined in claim 24, wherein the third amplifier is a power amplifier driving the signal at saturation.

26. A method for intermediate frequency sampling, the method comprising the steps of:

receiving an input signal;

modulating the input signal to produce an in-phase and a quadrature phase signal at an intermediate frequency;

filtering the intermediate frequency in-phase and quadrature phase signals in a complex domain filter, producing an in-phase and a quadrature phase filtered signal;

adding the in-phase and the quadrature phase filtered signals from the complex domain filter together, yielding a result signal; and digitizing the result signal, sampling at four times the intermediate frequency.

27. The method as defined in claim 26, wherein the method further comprises the step of filtering the input signal prior to modulating the filtered input signal to an intermediate frequency.

28. The method as defined in claim 27, wherein the method further comprises the step of delaying one of the in-phase and quadrature phase filtered signals from the complex domain filter prior to adding said signals together to obtain a result.

29. A method for receiving a radio signal, the method comprising the steps of:
receiving an input signal;
filtering the input signal in a first filter having a response characterized by a steep selectivity and a narrow bandpass;
modulating the signal to produce an in-phase and a quadrature phase signal at an intermediate frequency;
filtering the intermediate frequency in-phase and quadrature phase signals in a channel selection filter, producing an in-phase and a quadrature phase filtered signal;
I/Q sampling the quadrature phase filtered signal by sampling the in-phase and quadrature phase signals, delaying the in-phase signal, and adding the delayed in-phase signal and an undelayed quadrature phase signal together to yield a result signal;
digitizing the result signal; and
modulating the digitized signal from the intermediate frequency to obtain a baseband in-phase data signal and a baseband quadrature phase data signal.

30. The method as defined in claim 29, wherein the method further comprises the step of filtering the baseband in-phase and baseband quadrature phase data signals to remove unwanted adjacent harmonics from the baseband in-phase and the baseband quadrature phase data signals.

31. The method as defined in claim 29, wherein the intermediate frequency is about 15 MHz.

32. The method as defined in claim 31, wherein the first and second modulators use a local oscillator phase-locked loop to generate the intermediate frequency.

33. The method as defined in claim 32, wherein the modulating to baseband is performed by modulating the quantized signal with a 0, 1, 0, −1 sequence to obtain the baseband in-phase data signal and modulating the quantized signal with a 1, 0, −1, 0 sequence to obtain the baseband quadrature phase data signal.

34. The method as defined in claim 29, wherein the method further comprises a method for transmitting a radio signal comprising the steps of:
receiving an in-phase transmit signal and a quadrature phase transmit signal in baseband;
transforming the in-phase and quadrature phase transmit signals from baseband to a second intermediate frequency and adding the signals together to get a digital signal;
converting the digital signal to an analog signal;
converting the analog signal from the second intermediate frequency to a first intermediate frequency;
amplifying the first intermediate frequency analog signal;
filtering the amplified signal in a filter having a response characterized by a steep selectivity and a narrow bandpass; and
converting the filtered amplified signal from the first intermediate frequency to a transmit frequency signal.

35. The method as defined in claim 34, wherein the method further comprises filtering the in-phase and quadrature phase transmit signals before transforming the signal from baseband to a second intermediate frequency.

36. The method as defined in claim 35, wherein the method further comprises:
filtering the transmit frequency signal at transmit frequency in a bandpass filter;
amplifying the filtered transmit frequency signal to transmission power, filtering the amplified transmit signal; and
transmitting the signal.

37. The method as defined in claim 36, wherein the transforming to baseband is performed according to a transformation method comprising the steps of multiplying the in-phase signal by a 0, 1, 0, −1 sequence and multiplying the quadrature phase signal by a 1, 0, −1, 0 sequence, before adding the in-phase and quadrature phase signals together.

38. The method as defined in claim 37, wherein the second intermediate frequency is about 15 MHz, the first intermediate frequency is about 1.5 GHz, and the transmit frequency is in the range of about 5.1 GHz to about 5.9 GHz.

39. The method as defined in claim 38, wherein the filtering characterized by steep selectivity and narrow bandpass is an intermediate frequency surface acoustical wave filter.

40. The method as defined in claim 39, wherein the amplifying of the filtered signal is performed by a power amplifier in saturation.

41. A radio system having a receiver, comprising:
means for intermediate frequency sampling, comprising:
a means for first filtering an input signal, said first filtering means being characterized by steep selectivity and narrow bandpass;
a means for modulating, modulating the filtered signal to a second intermediate frequency; and
means for second filtering of the second intermediate frequency signal, said second filtering means being characterized by a bandpass transfer function, without the steep selectivity provided by the first filtering means;
an I/Q sampling means for providing increased selectivity, the I/Q sampling means delaying an in-phase signal, and adding the delayed in-phase signal and an undelayed quadrature phase signal together to yield a resulting signal;
means for quantizing the resulting signal; and
means for transforming the quantized signal into a wanted baseband data signal in in-phase and quadrature phase components.

42. The radio system as defined in claim 41, wherein the system further comprises a third filtering means, said means receiving the wanted in-phase and quadrature phase baseband data signal components and filtering the adjacent harmonics out of the wanted in-phase and quadrature phase baseband data signal components.

43. The radio system as defined in claim 42, wherein the system further comprises a super-heterodyne front end creating the input signal, the super-heterodyne front end comprises:
means for selecting the input band;
means for amplifying the input band signal, which avoids adding noise;
means for fourth filtering, having a bandpass characteristic; and
means for modulating the result of the filter to obtain the input signal at a first intermediate frequency.

44. The radio system as defined in claim 43, wherein the input frequency is in the range of about 5.1 GHz to about 5.9 GHz, the first intermediate frequency is approximately 1.5 GHz, and the second intermediate frequency is about 15 MHz.

45. The radio system as defined in claim 44, wherein the radio further comprises a means for amplifying the output of the first filtering means prior to being input into the modulating means.

46. The radio system as defined in claim 41, further comprising a transmitter comprising:
- means for inputting a transmit signal having an in-phase and a quadrature phase component in baseband;
- means for sixth filtering, receiving and filtering the in-phase component and the quadrature phase component of the transmit signal;
- means for first modulating the output of the sixth filtering means from baseband to the second intermediate frequency and combining the transformed components;
- means for converting the output of the first modulation to an analog signal;
- means for second modulating the frequency of the analog signal to a first intermediate frequency;
- means for first amplifying the output of the second modulation means;
- means for seventh filtering, the means being characterized by steep selectivity and narrow bandpass, and the means filtering the output of the first amplification means;
- means for third modulating the output of the seventh filtering means to the transmit frequency;
- means for eighth filtering of the third modulating means output, having a bandpass characteristic;
- means for second amplifying of the output of the ninth filtering means, amplifying the signal to transmit power;
- means for ninth filtering of the second amplified signal; and means for transmitting the signal.

* * * * *